(12) United States Patent
Meguro

(10) Patent No.: US 12,159,491 B2
(45) Date of Patent: Dec. 3, 2024

(54) RETIGHTENING NOTIFICATION APPARATUS

(71) Applicant: ISUZU MOTORS LIMITED, Tokyo (JP)

(72) Inventor: Takayuki Meguro, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 54 days.

(21) Appl. No.: 18/181,098

(22) Filed: Mar. 9, 2023

(65) Prior Publication Data
US 2023/0298393 A1    Sep. 21, 2023

(30) Foreign Application Priority Data

Mar. 18, 2022    (JP) .................................. 2022-043732

(51) Int. Cl.
*G07C 5/00*    (2006.01)
*B60C 23/04*    (2006.01)

(52) U.S. Cl.
CPC .......... *G07C 5/006* (2013.01); *B60C 23/0433* (2013.01)

(58) Field of Classification Search
CPC ............................ G07C 5/006; B60C 23/0433
See application file for complete search history.

(56) References Cited

U.S. PATENT DOCUMENTS

| 9,008,894 B2* | 4/2015 | Bishop | G07C 5/008 |
| | | | 701/32.5 |
| 2016/0163131 A1* | 6/2016 | Steinlechner | G01M 17/013 |
| | | | 701/33.7 |
| 2017/0358155 A1* | 12/2017 | Krapf | G01C 21/3415 |
| 2018/0118158 A1* | 5/2018 | Davis | G08B 25/008 |
| 2018/0268620 A1* | 9/2018 | Kudou | G07C 5/006 |
| 2019/0258251 A1* | 8/2019 | Ditty | G05D 1/0274 |

FOREIGN PATENT DOCUMENTS

| JP | 2013-031926 A | 2/2013 |
| JP | 2017-149193 A | 8/2017 |
| WO | 2009/008133 A1 | 1/2009 |

\* cited by examiner

*Primary Examiner* — Thomas D Alunkal
(74) *Attorney, Agent, or Firm* — Shih IP Law Group, PLLC

(57) ABSTRACT

A retightening notification apparatus include: a travel distance acquiring part that acquires a distance traveled after attachment, which is a distance that a vehicle traveled from when a wheel of a tire was attached to the vehicle by tightening a fastening component such as a nut or a bolt, to the present moment; and a notification control part that provides notification prompting retightening of the fastening component if the acquired distance traveled after attachment becomes equal to or greater than a retightening distance, which is determined in accordance with a state of use of the fastening component.

8 Claims, 4 Drawing Sheets

RETIGHTENING NOTIFICATION APPARATUS

CROSS-REFERENCE TO RELATED APPLICATIONS

The present application claims priority to Japanese Patent Applications number 2022-043732, filed on Mar. 18, 2022, contents of which are incorporated herein by reference in their entirety.

BACKGROUND OF THE INVENTION

The present disclosure relates to a retightening notification apparatus that notifies about retightening of a fastening component for fastening a wheel.

In order to attach a wheel to a vehicle, it is necessary to tighten fastening components such as a bolt or a nut with appropriate torque. For example, Japanese Unexamined Patent Application Publication No. 2013-31926 discloses a torque wrench, in which a toggle mechanism operates to keep torque at a certain level, and thus prevents excess or deficiency in the torque by making the torque reach a predetermined value.

Since fastening components become loose while traveling even though the fastening components are tightened with appropriate torque, the axial force of the fastening components decreases. If a vehicle travels in a state where the axial force of the fastening components has decreased, a wheel may come off.

BRIEF SUMMARY OF THE INVENTION

The present disclosure has been made in view of these points, and its object is to prevent a wheel from coming off due to looseness of fastening components.

In an aspect of the present disclosure, there is provided a retightening notification apparatus including: a travel distance acquiring part that acquires a distance traveled after attachment, which is a distance that a vehicle traveled from when a wheel was attached to the vehicle by tightening a fastening component to the present moment; and a notification control part that provides notification prompting retightening of the fastening component if the distance traveled after attachment becomes equal to or greater than a retightening distance, which is determined in accordance with a state of use of the fastening component.

DETAILED DESCRIPTION OF THE INVENTION

Hereinafter, the present disclosure will be described through exemplary embodiments, but the following exemplary embodiments do not limit the invention according to the claims, and not all of the combinations of features described in the exemplary embodiments are necessarily essential to the solution means of the invention.

[Outline of the Retightening Notification System S]

Figure 1:
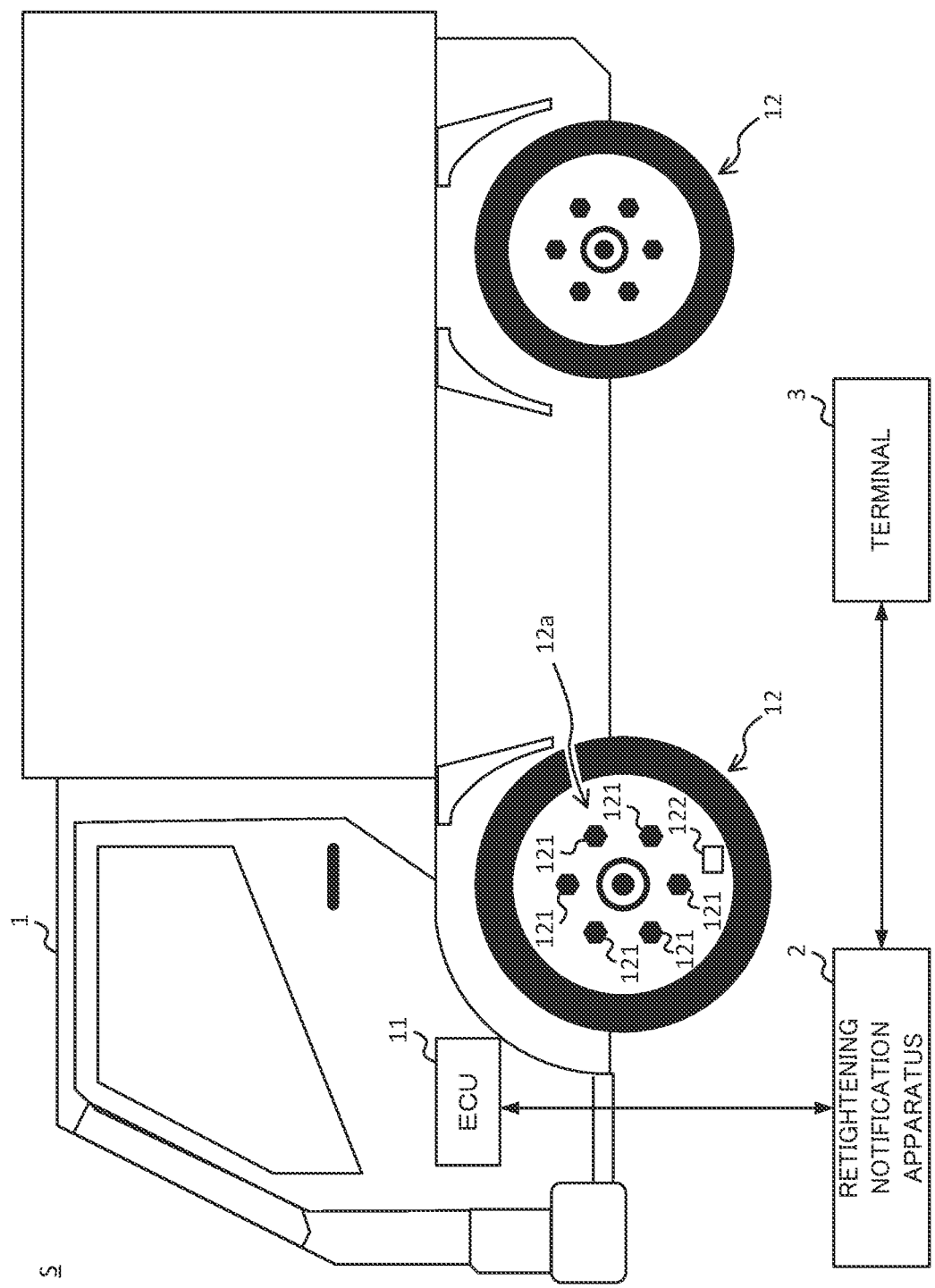
FIG. 1 is a diagram for explaining an outline of a retightening notification system.

FIG. 1 is a diagram for explaining an outline of a retightening notification system S. The retightening notification system S is a system for providing notification prompting retightening of a fastening component 121 such as a bolt or a nut for tightening a wheel 12a of a tire 12 attached to a vehicle 1. The retightening notification system S includes the vehicle 1, a retightening notification apparatus 2, and a terminal 3.

The vehicle 1 is a vehicle such as a truck or a trailer. The vehicle 1 is equipped with an Electronic Control Unit (ECU) 11. The ECU 11 transmits a cumulative travel distance of the vehicle 1 to the retightening notification apparatus 2 via wireless communication. For example, the ECU 11 transmits the latest cumulative travel distance to the retightening notification apparatus 2 every time the cumulative travel distance of the vehicle 1 is updated, or transmits the cumulative travel distance to the retightening notification apparatus 2 every predetermined interval. The predetermined interval is a predetermined distance or a predetermined time. The predetermined distance is 1 km, for example, and the predetermined time is 1 minute, for example.

The tire 12 of the vehicle 1 includes the wheel 12a and a tire mounted on the wheel 12a. The wheel 12a is attached to the vehicle 1 by tightening six fastening components 121, but the number of fastening components 121 is not limited thereto. Each wheel 12a is provided with a sensor 122. The sensor 122 is, for example, a sensor that detects air pressure of a tire. The sensor 122 transmits, to the ECU 11 installed in the vehicle 1, sensor identification information for identifying the sensor 122 itself together with the detected air pressure, via the wireless communication.

The ECU 11 acquires the radio field intensity of the wireless communication together with the sensor identification information transmitted from the sensor 122 via the wireless communication. The ECU 11 identifies a position where the wheel 12a was attached, on the basis of a plurality of pieces of sensor identification information transmitted during traveling of the vehicle 1 and the radio field intensity of the wireless communication. Further, the ECU 11 detects that a wheel 12a has been attached to the vehicle 1 based on changes in the sensor identification information and the radio field intensity caused by replacing the wheel 12a that was attached with a new wheel 12a. In other words, the ECU 11 is a detection device that detects that a wheel 12a has been attached to the vehicle 1 by detecting changes in the sensor identification information of the sensor provided to the wheel 12a and the radio field intensity.

The ECU 11 transmits, to the retightening notification apparatus 2, a cumulative travel distance obtained when it was detected that the wheel 12a was attached to the vehicle 1, as a cumulative travel distance at the time when the wheel 12a was attached to the vehicle 1. As an example, the ECU 11 associates information indicating that it is detected that the wheel 12a was attached to the vehicle 1, with information indicating the cumulative travel distance at the time when the wheel 12a was attached to the vehicle 1 with each other, and transmits these pieces of information to the retightening notification apparatus 2.

Incidentally, even though the fastening components 121 are tightened with appropriate torque, the fastening components 121 become loose, and the axial force decreases while the vehicle 1 is traveling. For example, the axial force of the fastening components 121 decreases due to initial loosening. Specifically, the underside of the head of a fastening component 121 or irregularities on a surface where objects to be fastened are in contact with each other may be worn to form a gap, or the tensile force and the compressive force between the fastening component 121 and the object to be fastened may shift from an unstable state, in which they are not balanced, to a stable state in which they are balanced. When the vehicle 1 travels in a state where the axial force has decreased due to the initial loosening, the wheel 12a may come off.

Here, the retightening notification apparatus 2 provides notification prompting retightening of the fastening components 121, if a distance traveled after the wheel 12a was attached to the vehicle 1 by tightening the fastening components 121 to the present moment, measured on the basis of the cumulative travel distance, becomes equal to or greater than a distance that necessitates retightening. For example, the retightening notification apparatus 2 sends a message prompting retightening of the fastening components 121 to the terminal 3, thereby providing notification prompting retightening of the fastening components 121.

The terminal 3 is a terminal used by an administrator who manages the operation of the vehicle 1 or a driver who drives the vehicle 1. The terminal is, for example, a smartphone, a tablet, or a personal computer, but is not limited thereto. Since a user of the vehicle 1, such as an administrator or a driver who confirms the notified message, can understand that the fastening components 121 need retightening, the user can perform retightening before the fastening components become loose enough to make the wheel 12a come off. As a result, the user of the vehicle 1 can prevent the wheel 12a from coming off due to looseness of the fastening components 121.

Hereinafter, a configuration of the retightening notification apparatus 2 will be specifically described.

[Configuration of the Retightening Notification Apparatus 2]

Figure 2:
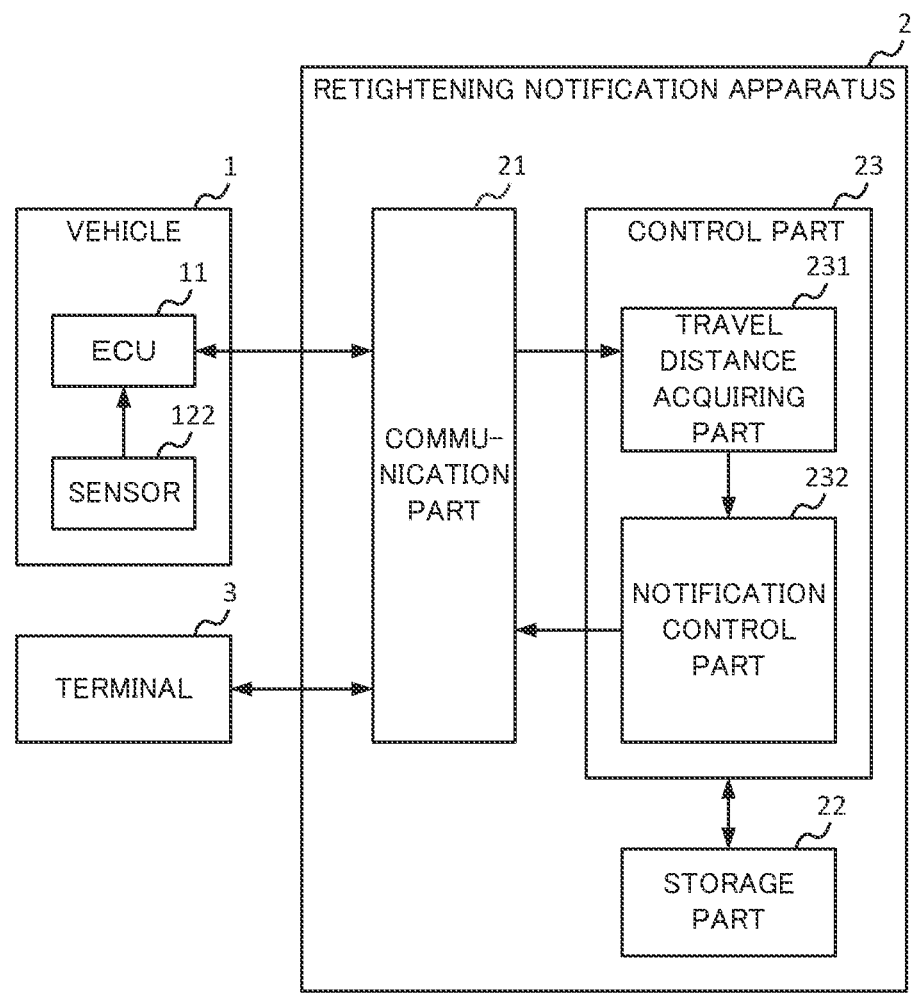
FIG. 2 is a diagram for explaining a configuration of a retightening notification apparatus.

FIG. 2 is a diagram for explaining the configuration of the retightening notification apparatus 2. The retightening notification apparatus 2 includes a communication part 21, a storage part 22, and a control part 23. The communication part 21 is a communication module for transmitting and receiving information to and from the vehicle 1 and the terminal 3. For example, the communication part 21 transmits and receives information to and from the vehicle 1 and the terminal 3 via the Internet.

The storage part 22 includes a storage medium such as a Read Only Memory (ROM), a Random Access Memory (RAM), and a hard disk. The storage part 22 stores a program executed by the control part 23.

The control part 23 is a calculation resource including a processor such as a Central Processing Unit (CPU). By executing a program stored in the storage part 22, the control part 23 functions as a travel distance acquiring part 231 and a notification control part 232.

The travel distance acquiring part 231 acquires the cumulative travel distance transmitted from the ECU 11. Specifically, the travel distance acquiring part 231 acquires the cumulative travel distance transmitted from the ECU 11 during traveling as a current cumulative travel distance of the vehicle 1.

Further, the travel distance acquiring part 231 acquires the cumulative travel distance of the vehicle 1 at the time when the wheel 12a was attached to the vehicle 1. For example, the travel distance acquiring part 231 acquires a first cumulative travel distance of the vehicle 1 input at the time when the wheel 12a was attached, as the cumulative travel distance at the time when the wheel 12a was attached to the vehicle 1. Specifically, the travel distance acquiring part 231 acquires, as the first cumulative travel distance, the cumulative travel distance of the vehicle 1 input to the terminal 3 by the driver or the administrator of the vehicle 1 together with information indicating that the wheel 12a was attached to the vehicle 1.

The travel distance acquiring part 231 may acquire a second cumulative travel distance of the vehicle 1, at the time when it is detected that the wheel 12a was attached to the vehicle 1, as the cumulative travel distance when the wheel 12a was attached to the vehicle 1. Specifically, the travel distance acquiring part 231 acquires, as the second cumulative travel distance, the cumulative travel distance transmitted from the ECU 11, which detected that the wheel 12a was attached to the vehicle 1 in association with information indicating that the wheel 12a was attached to the vehicle 1.

The travel distance acquiring part 231 acquires at least one of the first cumulative travel distance and the second cumulative travel distance, as the cumulative travel distance of the vehicle 1 at the time when the wheel 12a was attached to the vehicle 1.

It should be noted that since the sensor 122 transmits the sensor identification information after the vehicle 1 starts traveling, the ECU 11 detects that the wheel 12a was attached to the vehicle 1 after the vehicle 1 starts traveling. In other words, the timing when the ECU 11 detects that the wheel 12a was attached to the vehicle 1 is later than the timing when the wheel 12a was actually attached to the vehicle 1. Therefore, the second cumulative travel distance at the time when the ECU 11 detects that the wheel 12a was attached to the vehicle 1 is greater than the first cumulative travel distance at the moment when the wheel 12a was actually attached to the vehicle 1. Here, when both the first cumulative travel distance and the second cumulative travel distance are acquired, the travel distance acquiring part 231 acquires the shorter one of the first cumulative travel distance and the second cumulative travel distance, as the cumulative travel distance of the vehicle 1 at the time when the wheel 12a was attached. Therefore, the travel distance acquiring part 231 can acquire, as the cumulative travel distance of the vehicle 1 at the time when the wheel 12a was attached, a distance closer to the cumulative travel distance at the moment when the wheel 12a was actually attached to the vehicle 1.

The travel distance acquiring part 231 acquires a difference between the current cumulative travel distance of the vehicle 1 and the cumulative travel distance of the vehicle 1 at the time when the wheel 12a was attached, as a distance traveled after attachment, which is the distance the vehicle 1 has traveled from when the wheel 12a was attached to the vehicle 1 by tightening the fastening components 121 to the present moment. Specifically, the notification control part 232 acquires, as the distance traveled after attachment, a difference between a) the shorter one of the first cumulative travel distance and the second cumulative travel distance, and b) the current cumulative travel distance of the vehicle 1.

The notification control part 232 provides notification prompting retightening of the fastening components 121 if the distance traveled after attachment becomes equal to or greater than a retightening distance, which is determined in accordance with a state of use of the fastening components 121. The retightening distance is a distance at which the wheel 12a may come off due to decreased axial force, and a specific value of the retightening distance is 50 km, for example. The notification control part 232 transmits, to the terminal 3, information for displaying a message prompting retightening of the fastening components 121, thereby providing notification prompting retightening of the fastening components 121. The message is a sentence such as "The vehicle 1 has traveled the retightening distance or more after the wheel 12a was attached to the vehicle 1. The fastening components 121 of the wheel 12a need retightening.", but the message is not limited to this. The terminal 3 that has received information for displaying the message causes a display part of the terminal 3 to display the message. Due to this, the user of the vehicle 1 can understand that the fastening components 121 need retightening.

The notification control part 232 may transmit information for displaying a message prompting retightening of the fastening components 121 not only to the terminal 3 but also to the ECU 11 of the vehicle 1. In this case, the ECU 11 causes a display provided to the driver's seat of the vehicle 1 to display the message prompting retightening of the fastening components 121. Thus, while driving the vehicle 1, the driver of the vehicle 1 can confirm that the fastening components 121 need retightening.

The notification control part 232 provides notification prompting retightening of the fastening components 121 if any one of the fastening components 121 of a plurality of wheels 12a of the vehicle 1 needs retightening. For example, the notification control part 232 provides notification prompting retightening together with notification of information for identifying a wheel 12a with the fastening components 121 that need retightening. Specifically, the notification control part 232 sends a message "The vehicle 1 has traveled 50 km or more after attachment of the right front wheel. The right front wheel needs retightening", thereby providing notification prompting retightening of the right front wheel. Therefore, the user of the vehicle 1 can understand the wheel 12a with the fastening components 121 that need retightening, among the plurality of wheels 12a of the vehicle 1.

Figure 3:
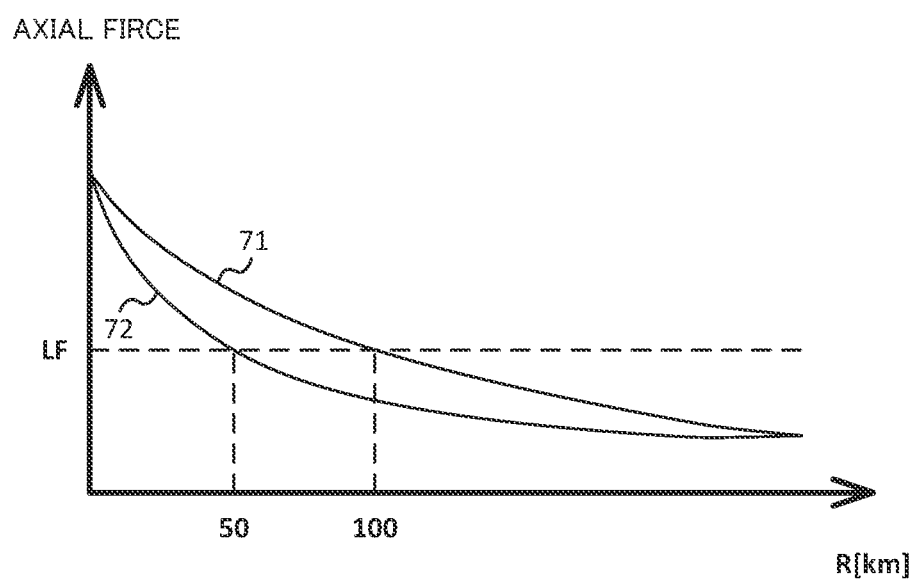
FIG. 3 is a diagram for explaining a change in axial force according to a state of use of a fastening component 121.

Incidentally, the degree of change in the axial force of the fastening components 121 varies depending on a state of use. FIG. 3 is a diagram for explaining a change in axial force in accordance with a state of use of the fastening components 121. The horizontal axis represents a distance R traveled after attachment. The vertical axis represents the axial force of the fastening components 121. If the axial force becomes less than the axial force LF, the wheel 12a may come off.

The curved line 71 indicates a change in the axial force in a state where the fastening component 121 is unused. The curved line 72 indicates a change in the axial force in a state where the fastening component 121 is used. The axial force of a fastening component 121 in an unused state is less likely to decrease than that of a fastening component 121 in a used state. Specifically, when the distance R traveled after attachment exceeds 100 km, the axial force of the fastening component 121 in the unused state becomes less than the axial force LF. On the other hand, when the distance R traveled after attachment exceeds 50 km, the axial force of the fastening component 121 in the used state becomes less than the axial force LF.

Here, the notification control part 232 changes the retightening distance in accordance with the state of use of the fastening component 121. In this case, the notification control part 232 acquires state information indicating whether the fastening component 121 is in the unused state, where the fastening component 121 has not been used in the past, or in the used state, where it was used in the past.

Specifically, the notification control part 232 acquires, from the terminal 3, the state information input through the terminal 3.

The notification control part 232 sets a retightening distance for a case where the state information indicates the unused state to be longer than a retightening distance for a case where the state information indicates the used state. Specifically, the notification control part 232 sets the retightening distance for a case where the fastening component 121 is in the unused state to be 100 km, and sets the retightening distance for a case where the fastening component 121 is in the used state to be 50 km. This makes it possible to provide notification prompting retightening depending on the state of use of the fastening component 121.

The notification control part 232 may restrict traveling of the vehicle 1 when retightening of the fastening components 121 is not performed even though the notification control part 232 provided notification prompting retightening. For example, the notification control part 232 restricts traveling of the vehicle 1 until the notification control part 232 acquires execution information indicating that retightening has been performed, from when notification prompting retightening was performed previously. Specifically, the notification control part 232 restricts traveling of the vehicle 1 when the notification control part 232 does not acquire the execution information input via the terminal 3 even though a waiting time has passed since the notification prompting retightening was provided. The waiting time is a time it takes for the vehicle 1 to travel a distance at which the wheel 12a becomes probable to come off. The notification control part 232 sets the waiting time to be shorter as the speed of the vehicle 1 increases. A specific value of the waiting time is 10 minutes when the speed of the vehicle 1 is 60 kilometers per hour.

If the execution information is acquired while restricting traveling of the vehicle 1, the notification control part 232 cancels the restriction. In addition, the notification control part 232 does not restrict traveling of the vehicle 1 if the execution information is acquired by the time when the waiting time has passed from the previous instance of providing notification prompting retightening.

The notification control part 232 restricts traveling of the vehicle 1 by limiting at least one of the output of the power unit of the vehicle 1 or controlling an upper speed limit of the vehicle 1. When the speed of the vehicle 1 exceeds an upper speed limit in a case where an upper limit of the speed is set, the notification control part 232 operates the braking system of the vehicle 1 to decelerate the vehicle 1. This enables the notification control part 232 to prevent the fastening components 121 from becoming looser, thereby preventing the wheel 12a from coming off due to looseness of the fastening components 121. Further, if the power unit of the vehicle 1 is not activated, the notification control part 232 may stop the vehicle 1 from traveling by not activating the power unit of the vehicle 1. Therefore, the notification control part 232 can prevent the wheel 12a from coming off due to looseness of the fastening components 121 during traveling of the vehicle 1.

[Processing Executed by the Retightening Notification Apparatus 2]

Figure 4:
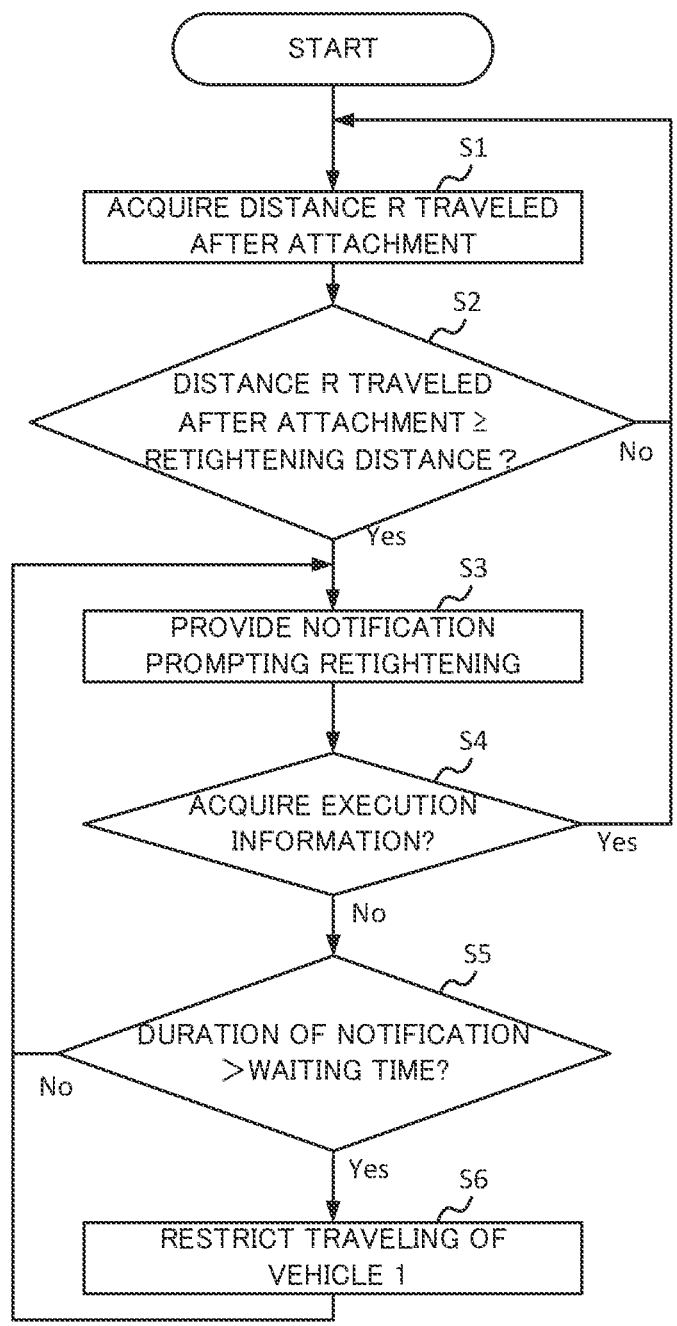
FIG. 4 is a flowchart showing an example of a flow of processing executed by the retightening notification apparatus.

FIG. 4 is a flowchart showing an example of a flow of processing executed by the retightening notification apparatus 2. The processing of the flowchart of FIG. 4 is executed every time the vehicle 1 travels a predetermined distance. The predetermined distance may be appropriately determined, and is 1 km, for example. It should be noted that before executing the processing of the flowchart of FIG. 4, it is assumed that a cumulative travel distance of the vehicle 1 at the time when the wheel 12a was attached to the vehicle 1 has been acquired.

The travel distance acquiring part 231 acquires a distance R traveled after attachment (step S1). Specifically, the travel distance acquiring part 231 acquires, as the distance R traveled after attachment, a difference between a current cumulative travel distance acquired from the vehicle 1 and a cumulative travel distance of the vehicle 1 at the time when the wheel 12a was attached to the vehicle 1.

The notification control part 232 determines whether or not the distance R traveled after attachment is equal to or greater than the retightening distance (step S2). If the distance R traveled after attachment is less than the retightening distance ("No" in step S2), the notification control part 232 returns to step S1.

If the distance R traveled after attachment is equal to or greater than the retightening distance ("Yes" in step S2), the notification control part 232 provides notification prompting retightening (step S3). Specifically, the notification control part 232 sends a message "The vehicle 1 has traveled the retightening distance or more after attachment of the wheel 12a to the vehicle 1. The fastening components 121 of the wheel 12a need retightening.", to the terminal 3.

The notification control part 232 determines whether or not the notification control part 232 acquired execution information indicating that retightening was performed (step S4). Specifically, the notification control part 232 determines whether or not the execution information input to the terminal 3 has been acquired.

If the execution information has been acquired ("Yes" in step S4), the notification control part 232 returns to step S1. If the execution information has not been acquired ("No" in step S4), the notification control part 232 determines whether or not the duration of notification, which is a time from when notification of retightening was provided to the present moment, has exceeded a waiting time (step S5).

If the duration of notification has not exceeded the waiting time ("No" in step S5), the notification control part 232 returns to step S3, and repeats the steps S3 to S5 until the notification control part 232 acquires the execution information or until the duration of notification exceeds the waiting time. If the duration of notification has exceeded the waiting time ("Yes" in step S5), the notification control part 232 restricts traveling of the vehicle 1 (step S6). Specifically, the notification control part 232 reduces the output of the power unit of the vehicle 1. Further, the notification control part 232 may operate the braking system of the vehicle 1 to stop the vehicle 1. Thus, the notification control part 232 can prevent the vibration of the vehicle 1, thereby preventing the wheel 12a from coming off the vehicle 1.

MODIFIED EXAMPLE

The travel distance acquiring part 231 may acquire, as the distance traveled after attachment, a difference between the cumulative travel distance of the vehicle 1 at the time when the wheel 12a was attached and the current cumulative travel distance of the vehicle 1, but the travel distance acquiring part 231 may acquire the distance traveled after attachment by another method. For example, the ECU 11 of the vehicle 1 transmits, to the retightening notification apparatus 2, a distance traveled from when the wheel 12a was attached to the vehicle 1 to the present moment, as the distance traveled after attachment, and the travel distance acquiring part 231 acquires the distance traveled after attachment from the vehicle 1.

[Effect of the Retightening Notification Apparatus 2]

As described above, if the distance traveled after attachment, which is a distance that the vehicle 1 traveled from when the wheel 12a was attached to the vehicle 1 to the present moment, becomes equal to or greater than the retightening distance, which is determined in accordance with a state of use of the fastening components 121, the retightening notification apparatus 2 provides notification prompting retightening of the fastening components 121. Due to this, an administrator or a driver of the vehicle 1 who confirms the notification prompting retightening can understand that the fastening components 121 need retightening. As a result, since an administrator or a driver can perform retightening of the fastening components 121, it is possible to prevent the wheel 12a from coming off due to looseness of the fastening components 121.

The present disclosure has been described above on the basis of the exemplary embodiments. The technical scope of the present disclosure is not limited to the scope explained in the above embodiments, and it is obvious to those skilled in the art that various changes and modifications within the scope of the invention may be made. An aspect to which such changes and modifications are added can be included in the technical scope of the present invention is obvious from the description of the claims.

What is claimed is:

1. A retightening notification apparatus comprising a memory storing executable instructions that, in response to execution, cause a processor to perform operations comprising:
acquiring a distance traveled after attachment, which is a distance that a vehicle traveled from when a wheel was attached to the vehicle by tightening a fastening component to a present moment,
acquiring state information indicating whether the fastening component is in an unused state where the fastening component has not been previously used, or in a used state where the fastening component was previously used,
setting a retightening distance when the state information indicates the unused state to be longer than a retightening distance when the state information indicates the used state; and
providing notification prompting retightening of the fastening component if the distance traveled after attachment becomes equal to or greater than the retightening distance.

2. The retightening notification apparatus according to claim 1, further comprising acquiring, as a cumulative travel distance of the vehicle at a time when the wheel was attached, at least one of a first cumulative travel distance of the vehicle input when the wheel was attached or a second cumulative travel distance of the vehicle when it is detected that the wheel was attached to the vehicle.

3. The retightening notification apparatus according to claim 2, wherein if both the first cumulative travel distance and the second cumulative travel distance are acquired, acquiring a shorter one of the first cumulative travel distance and the second cumulative travel distance, as a cumulative travel distance of the vehicle at the time when the wheel was attached.

4. The retightening notification apparatus according to claim 2, further comprising acquiring the second cumulative travel distance if a detection device detects changes in sensor identification information of a sensor provided to the wheel and radio field intensity.

5. The retightening notification apparatus according to claim 1, further comprising providing notification prompting retightening of the fastening component together with notification of information for identifying one or more wheels with the fastening component that needs retightening among a plurality of the wheels.

6. The retightening notification apparatus according to claim 1, further comprising controlling at least one of output of a power unit or an upper speed limit of the vehicle, until the notification control part acquires execution information indicating that retightening was performed on the wheel from when the notification prompting retightening was provided previously.

7. The retightening notification apparatus according to claim 1, wherein in response to further execution, causes the processor to perform further operations comprising:
   restricting traveling of the vehicle in a case that retightening is not performed even though a waiting time has passed since the notification prompting retightening was provided.

8. The retightening notification apparatus according to claim 7, wherein the waiting time is shorter as the speed of the vehicle increases.

\* \* \* \* \*